United States Patent [19]

Lin

[11] Patent Number: 5,496,076
[45] Date of Patent: Mar. 5, 1996

[54] FAST TUBE CONNECTOR STRUCTURE

[76] Inventor: Yo-Chia Lin, 5th Fl., No. 1, Lane 193, Chung Cheng N. Road, Sanchung City, Taipei Hsien, Taiwan

[21] Appl. No.: 298,252

[22] Filed: Aug. 30, 1994

[51] Int. Cl.$^6$ .................................................. F16L 17/035
[52] U.S. Cl. .......................... 285/110; 285/340; 285/342; 285/348; 285/354; 285/910
[58] Field of Search ...................................... 285/340, 910, 285/110, 348, 342, 354

[56] References Cited

U.S. PATENT DOCUMENTS

| | | | |
|---|---|---|---|
| 2,394,351 | 2/1946 | Murzburger | 285/348 X |
| 3,140,107 | 7/1964 | Hynes | 285/348 X |
| 3,219,751 | 11/1965 | Pfendler et al. | 285/340 X |
| 3,434,744 | 3/1969 | Yoke et al. | 285/348 X |
| 3,633,944 | 1/1972 | Hamburg | 285/340 X |
| 4,082,326 | 4/1978 | Bryson | 285/348 X |
| 4,146,254 | 3/1979 | Turner et al. | 285/340 X |

FOREIGN PATENT DOCUMENTS

| | | | |
|---|---|---|---|
| 863881 | 1/1953 | Germany | 285/340 |

Primary Examiner—Dave W. Arola
Attorney, Agent, or Firm—Pro-Techtor International

[57] ABSTRACT

A fast tube connector structure including a tube connector, a rubber fastening washer, a guiding sleeve, a conic spring washer and a sleeve-like nut, wherein a tube is inserted through the nut into a space defined by the spring washer, guiding sleeve and fastening washer and located on a tube seat of the tube connector. The nut is then secured onto the tube connector, forcing the spring washer to move downward and causing a narrow end thereof to move downward along an inclined guiding flange. The claw portion is thus compresses by the guiding flange to tightly clamp and fasten the tube and firmly fictionally associate the tube with the tube connector. The claw portion also exerts a downward pushing force on the guiding sleeve, urging the guiding sleeve to compress and deform the fastening washer located on a washer seat of the tube connector and surrounded by the guiding sleeve so that an outer sealing rim of the fastening washer tightly abuts the washer seat of the tube connector and an inner sealing rim is tightly plugged into an adjoining clearance between the tube and the washer seat so as to enhance the engagement between the tube and the tube connector to achieve a reliable leakproof effect.

2 Claims, 3 Drawing Sheets

FAST TUBE CONNECTOR STRUCTURE

BACKGROUND OF THE INVENTION

The present invention relates to a check tube connector, and more particularly to a fast tube connector for connecting two metal tubes in two directions containing an angle. This tube connector is able to more reliably connect two tubes while having longer using life.

FIG. 1 shows a conventional tube connector 101, wherein a rubber washer 102 and a metal washer 103 are fitted into the tube connector 101 in sequence and a nut 104 is used to tighten the rubber washer 102 and metal washer 103 and force the same against outer wall of a tube 105 inserted in one end of the tube connector 101 so as to establish a frictional engagement therebetween. Therefore, the tube 105 is connected with the tube connector 101 and prevented from detaching therefrom. The rubber washer 102 and metal washer 103 are provided with slant edges and dented portions for enhancing the frictional engagement between the rubber washer 102 and metal washer 103 and the outer wall of the tube 105.

However, several shortcomings exist in such structure as follows:

1. After a long period of use, the rubber washer 102 tends to elastically fail and damage due to over-tightening of the nut 104 on the tube connector 101. On the other hand, in the case that the nut 104 is insufficiently tightened, the rubber washer 102 will exert insufficient pressure on the outer wall of the tube 105 and thus the tube 105 cannot be firmly connected with the tube connector 101.

2. In case the tube line is located at a site where often suffering shocking force, after a period of use, the engagement between the nut 104 and the tube connector 101 will become loosened. This will lead to the detachment of the tube 105 from the tube connector 101.

3. The nut 104 must be formed with relatively long thread so as to effectively tighten the nut 104 on the tube connector 101 and compress the rubber washer 102 and metal washer 103 against the tube 105. Therefore, it will cost quite a long time to connect the tube 105 with the tube connector 101.

Therefore, it is necessary to provide an improved tube connector to eliminate the above shortcomings.

SUMMARY OF THE INVENTION

It is therefore a primary object of the present invention to provide an improved tube connector in which the rubber fastening washer has a using life longer than that of conventional device and has a greater resistance against external shocking force. Therefore, a tube can be more firmly and reliably connected with the tube connector without loosening.

According to the above object, the fast tube connector comprises a tube connector, a rubber fastening washer, a guiding sleeve, a conic spring washer and a sleeve-like nut wherein a tube is inserted through the nut into a space defined by the spring washer, guiding sleeve and fastening washer and located on the tube seat of the tube connector. The nut is then secured onto a tube connector, forcing the spring washer to move downward and making a slideproof claw portion thereof guided by an inclined guiding flange of the guiding sleeve to move downward and inward along the inclined guiding flange. The slideproof claw portion is thus compressed by the guiding flange to tightly clamp and fasten the tube and firmly frictionally associate the tube with the tube connector.

Moreover, a lower end of the fastening washer is formed with an outer and an inner sealing rims and inner wall of the fastening washer is formed with several slideproof ribs. In addition, the downward moving slideproof claw portion will exert a downward pushing force on the the guiding sleeve, urging the same to compress and deform the the fastening washer located on a washer seat of the tube connector and surrounded by the guiding sleeve so that an outer sealing rim of the fastening washer tightly abut against the washer seat of the tube connector and an inner sealing rim is tightly plugged into an adjoining clearance between the tube and the washer seat so as to enhance the engagement between the tube and the tube connector and achieve a reliable leakproof effect.

Furthermore, the guiding sleeve is designed with a length shorter than that of the fastening washer by a predetermined value. An abutting rim is formed on the lower end of the fastening washer beside the inner sealing rim and an annular groove is thus defined between the outer sealing rim and the abutting rim. Accordingly, the fastening washer can be compressed downward by the guiding sleeve until a bottom thereof abuts against the washer seat of the tube connector. Also, the annular groove helps in buffering the compressing force exerted on the fastening washer 15 so that the elasticity of the fastening washer is prevented from being deteriorated due to long period of compression.

The present invention can be best understood through the following description and accompanying drawings, wherein:

DETAILED DESCRIPTION OF THE PREFERRED EMBODIMENT

Figure 1:
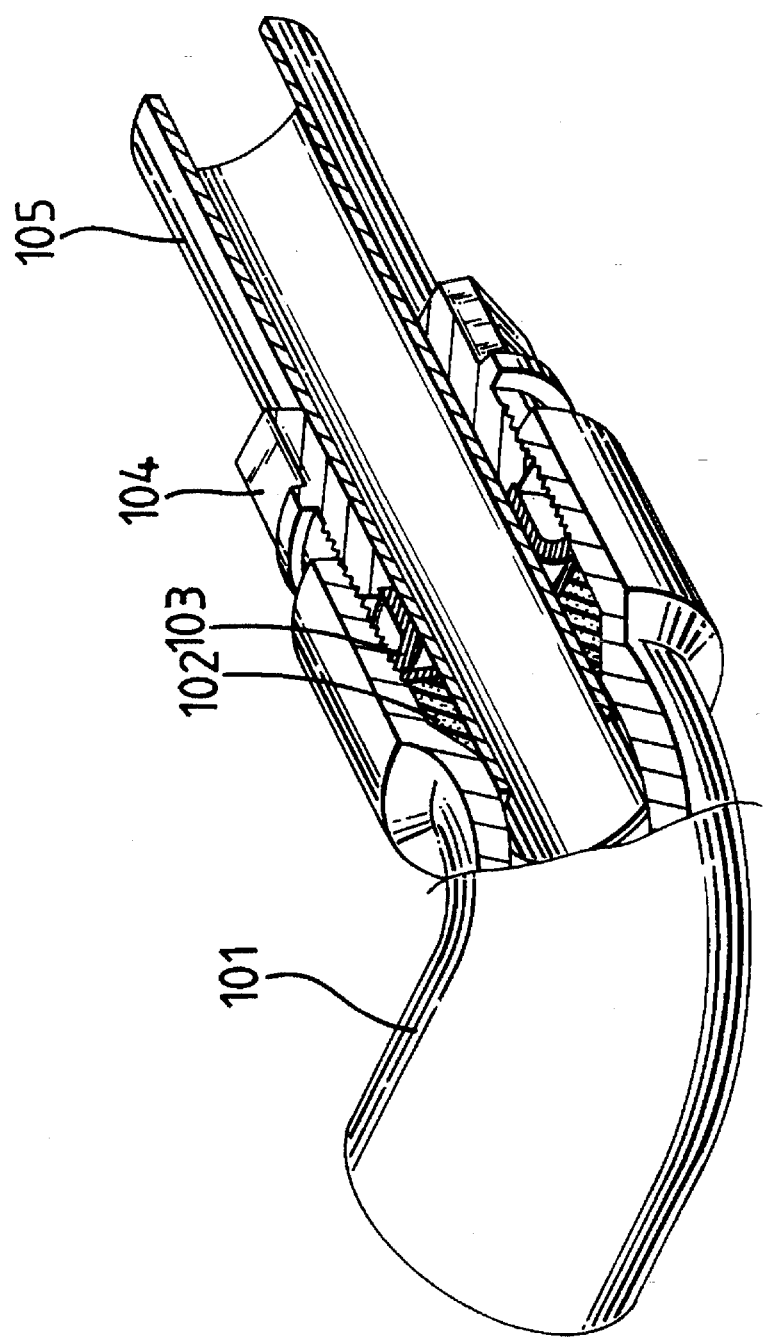
FIG. 1 is a perspective partially sectional view of a conventional tube connector.
Figure 2:
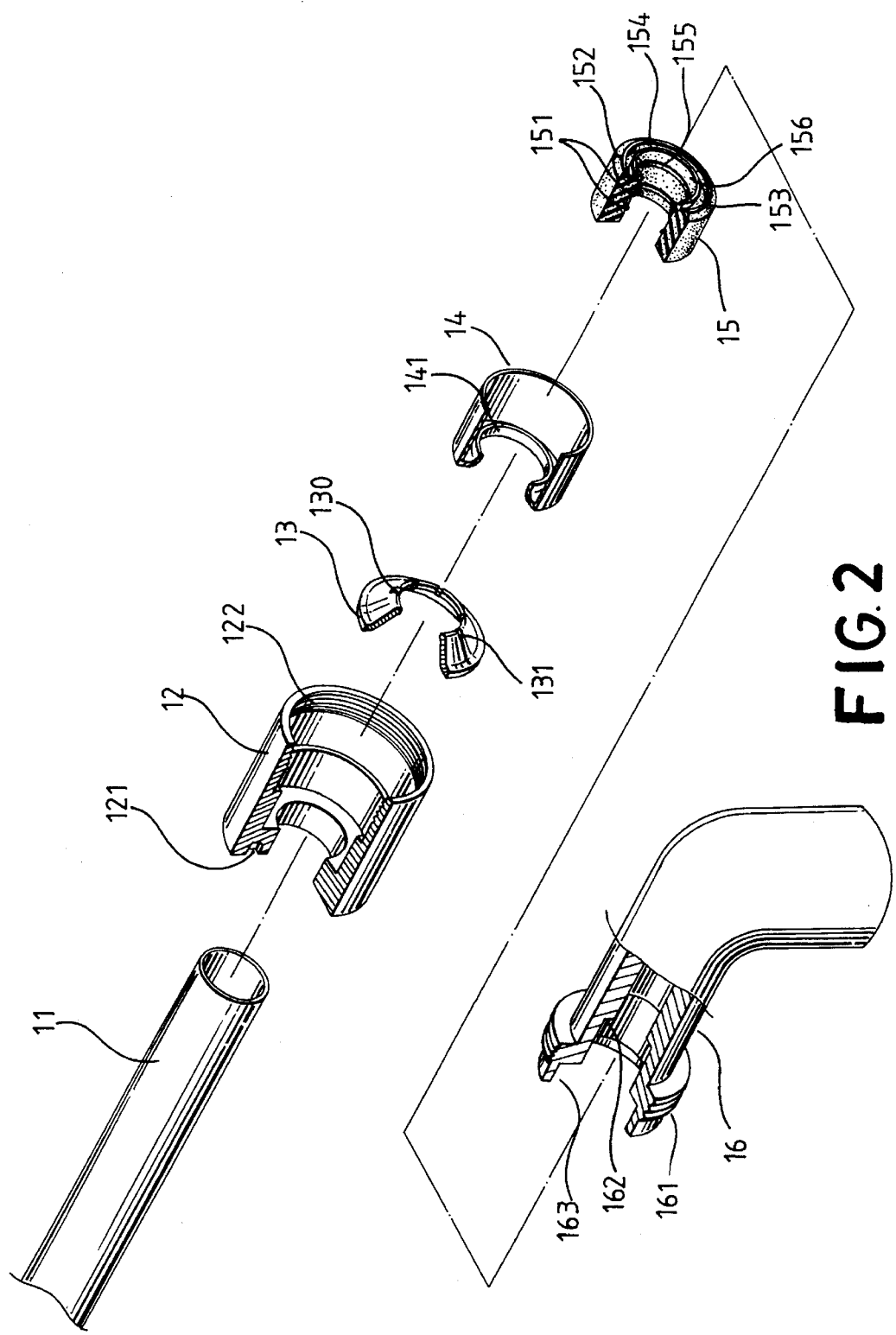
FIG. 2 is a perspective exploded view of the present invention.

Please refer to FIG. 2. The tube connector structure of the present invention includes a tube connector 16, a rubber fastening washer 15, a guiding sleeve 14, a conic spring washer 13, a sleeve-like nut 12. The tube connector 15 has an outer thread portion 161, an inner annular stepped tube seat 162 and an inner annular stepped washer seat 163. One end 156 of the fastening washer 15 is formed with an outer sealing rim 152, an abutting rim 154 and an inner sealing rim 155 which are concentric to the outer sealing rim 152. The abutting rim 154 has a height equal to that of the outer sealing rim 152 while the inner sealing rim 155 has a height slightly larger than that of the abutting rim 154. An elastic annular groove is defined between the abutting rim 154 and the outer sealing rim 152 and multiple slideproof ribs 151 are formed on inner wall of the fastening washer 15. One end of the guiding sleeve 14 has an inward inclined guiding flange 141. The conic spring washer 13 has a lower slideproof claw portion 130 formed with several fissures 131. One end of the sleeve-like nut 12 is formed with two thread holes 121 and the other end thereof is formed with inner thread 122.

When assembled, the end 156 of the fastening washer 15 with the outer sealing rim 152, inner sealing rim 155 and abutting rim 154 is placed onto the washer seat 163 of the tube connector 16 and then the guiding sleeve 14 is placed onto the fastening washer 15 with the inward inclined guiding flange 141 snugly fitted on an upper end of the fastening washer 15. Then, the spring washer 13 is placed onto the guiding sleeve 14 with the slideproof claw portion 130 located above the guiding flange 141 of the guiding sleeve 14. Thereafter, a tube 11 is inserted through the nut 12 into a space defined by the spring washer 13, guiding sleeve 14 and fastening washer 15 and located on the tube seat 162 of the tube connector 16. Finally, the nut 12 is secured on the tube connector 16 by engaging the inner thread 122 of the nut 12 with the outer thread 161 of the tube connector 16.

Figure 4:
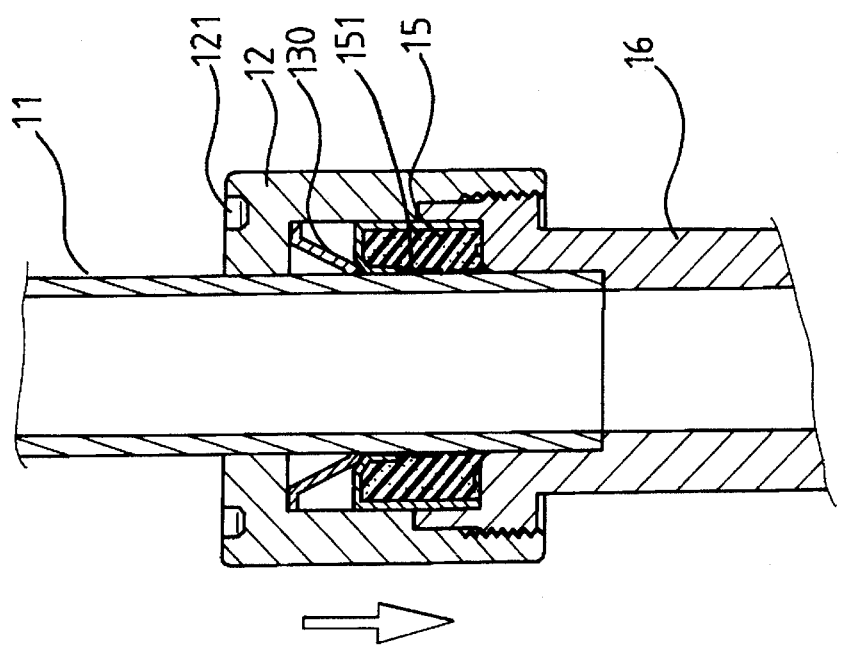
FIG. 4 is a sectional view showing that the nut is screwed downward and tightened onto the tube connector.
Figure 3:
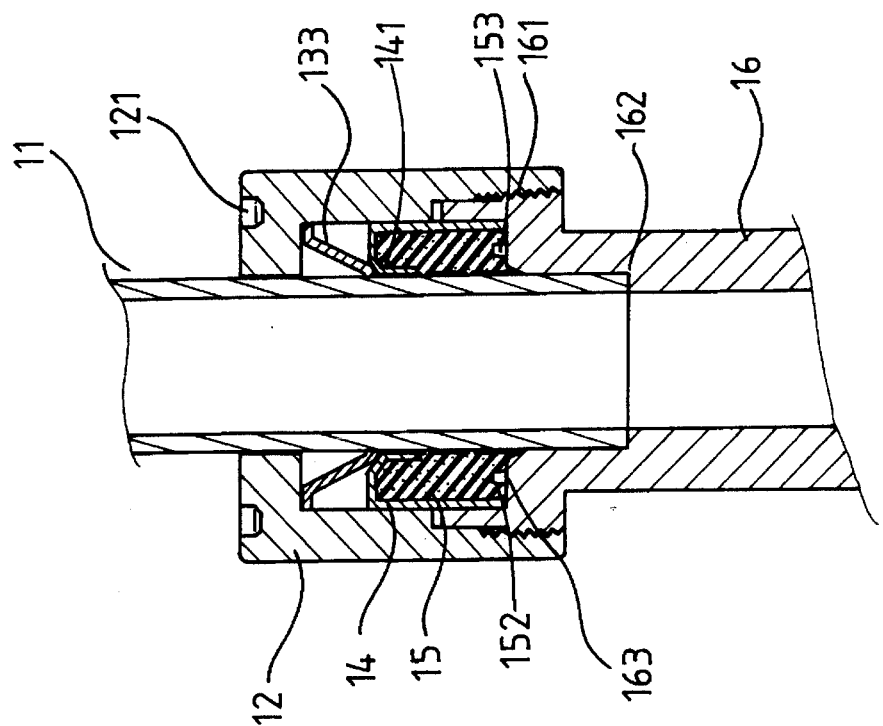
FIG. 3 is a sectional view showing that the nut is not yet screwed downward and tightened onto the tube connector.

Please refer to FIGS. 3 and 4, wherein the outer sealing rim 152 and abutting rim 154 of the fastening washer 15 are located on the washer seat 163 of the tube connector 16 while the inner sealing rim 155 is plugged into an adjoining clearance defined between the tube 11 and the washer seat 163. The inclined guiding flange 141 of the guiding sleeve 14 is fitted around the upper end of the fastening washer 15, whereby when the nut 12 is not screwed downward and tightened yet, the spring washer 13 is located over the guiding sleeve 14 with the slideproof claw portion 130 positioned above the guiding flange 141 of the guiding sleeve 14. While when the nut 12 is screwed downward, forcing the spring washer 13 to move downward, the slideproof claw portion 130 thereof is guided by the inclined guiding flange 141 of the guiding sleeve 14 to move downward and inward along the inclined guiding flange 141. At this time, by means of the fissures 131 formed on the slideproof claw portion 130, the same is simultaneously compressed by the guiding flange 141 so as to tightly clamp and fasten outer wall of the tube 11. In addition, the spring washer 13 exerts a downward pushing force on the the guiding sleeve 14, urging the same to compress and deform the the fastening washer 15 surrounded by the guiding sleeve 14. Therefore, the outer sealing rim 152 of the fastening washer 15 will tightly abut against the washer seat 163 of the tube connector 16 and the inner sealing rim 155 is more tightly plugged into the adjoining clearance between the tube 11 and the washer seat 163. The inner slideproof ribs 151 of the fastening washer 15 help in preventing leakage. Furthermore, because the guiding sleeve 14 is designed with a length shorter than that of the fastening washer 15 by a predetermined value and the annular groove 153 between the outer sealing rim 152 and abutting rim 154 helps in buffering the compressing force exerted on the fastening washer 15, the fastening washer 15 can be compressed downward until a bottom of the guiding sleeve 14 abuts against the washer seat 163 and thus the elasticity of the fastening washer 15 is prevented from being deteriorated due to long period of compression. As a result, the using life of the fastening washer is prolonged and the tube 11 is more Firmly and reliably connected with the tube connector 16 even when continuously suffering shocking force.

In conclusion, the present invention provides an improved fast tube connector in which the rubber washer is protected From being damaged due to over-tightening of the nut and long period of compression. In addition, the tube can be fast connected with the tube connector with a better leakproof and slideproof effect. Also, once the tube is connected with the tube connector, the tube is reliably engaged with the tube connector and is prevented from loosening due to external shocking force.

It should be noted that many modifications of the above embodiment of the present invention can be made without departing from the spirit of the present invention and thus should fall within the scope Of the present invention.

What is claimed is:

1. A tube connector comprising:

a tube connector including an outer threaded portion, an inner annular stepped tube seat, and an inner annular stepped washer seat;

a rubber fastening washer having a first and second end with said first end that is placed on said washer seat of said tube connector;

a guiding sleeve means placed on said fastening washer, said guiding sleeve means including an inwardly tapered guiding flange for securely receiving said second end of said fastening washer;

a conic spring washer that abuts said guiding sleeve means, said conic spring washer including a plurality of fissures in a narrow end thereof, said narrow end being received in said guiding flange of said guiding sleeve means; and a nut including an inner threaded portion, said nut being screwed onto said outer threaded portion of said tube connector, said nut further including a receiving means to receive and seat a tube and an annular conic spring washer seat to receive said conic spring washer; and wherein an end of a tube is inserted into said receiving means of said nut and respectively through said conical spring washer, said guiding sleeve means, and said fastening washer, said end of said tube received in said annular stepped tube seat, said nut being tightened onto said threaded portion of said tube connector, thereby compressing said conic spring washer into said guiding flange and into engagement with said tube and said guiding sleeve means, and said fastening washer into said annular stepped washer seat in said tube connector, said narrow end of said conic spring washer tightly gripping said tube so that said tube is firmly fixed in said tube connector.

2. The tube connector as claimed in claim 1 wherein:

said first end of said fastening washer includes an outer sealing rim, an inner sealing rim, and an abutting rim between said outer and said inner sealing rims, said outer sealing rim and said abutting rim defining an annular groove so as to increase the compressibility of said fastening washer;

said fastening washer further including multiple annular ribs on an inner wall;

said narrow end of said conic spring washer presses against said guiding flange when said nut is tightened causing said fastening washer to be compressed so that said outer sealing rim of said fastening washer tightly abuts said annular washer seat of said tube connector such that said inner sealing rim is wedged between said end of said tube and said washer seat, thereby reducing any possibility of leakage in said tube connector.

\* \* \* \* \*